United States Patent
Beisswenger et al.

(10) Patent No.: US 6,237,368 B1
(45) Date of Patent: May 29, 2001

(54) PROCESS FOR THE REGULATING OR CONTROLLING THE $NO_x$ CONTENT OF EXHAUST GASES GIVEN OFF DURING THE OPERATING OF GLASS MELTING FURNACES WITH SEVERAL BURNERS RUN ALTERNATELY

(75) Inventors: Hans Beisswenger, Bad Sodem; Klaus Hasselwander, Oberusel; Hansjörg Herden, Rodgau; Gernot Mayer-Schwinning, Bad Homburg; Gurudas Samant, Fronhausen; Peter Ludwig, Beuren, all of (DE)

(73) Assignee: Metallgesellschaft Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/202,523
(22) PCT Filed: Jun. 5, 1997
(86) PCT No.: PCT/EP97/02919
§ 371 Date: Aug. 30, 1999
§ 102(e) Date: Aug. 30, 1999
(87) PCT Pub. No.: WO97/48481
PCT Pub. Date: Dec. 24, 1997

(30) Foreign Application Priority Data

Jun. 20, 1996 (DE) .............................................. 196 24 619

(51) Int. Cl.⁷ ...................................................... C03B 5/16
(52) U.S. Cl. ........................ 65/29.12; 65/29.11; 65/29.13; 65/134.6; 65/157; 65/158; 65/160; 65/DIG. 13; 95/8; 95/25; 95/232; 96/244; 423/235; 423/239.1; 422/119; 422/105; 422/120; 422/900
(58) Field of Search ................................. 65/29.11, 29.12, 65/29.13, 134.6, 157, 158, 160, DIG. 13; 95/8, 25, 232; 96/244; 423/235, 239.1; 422/119, 105, 120, 900

(56) References Cited

U.S. PATENT DOCUMENTS

| 4,186,109 | * | 1/1980 | Atsukawa et al. . |
| 4,302,205 | | 11/1981 | Muraki et al. . |
| 4,312,280 | * | 1/1982 | Shearer et al. . |

(List continued on next page.)

FOREIGN PATENT DOCUMENTS

| 28 03 876 | 8/1978 | (DE) . |
| 33 37 793 | 5/1985 | (DE) . |
| 36 31 729 | 3/1988 | (DE) . |
| 41 39 862 | 6/1993 | (DE) . |
| 42 37 705 | 5/1994 | (DE) . |
| 44 34 943 | 4/1996 | (DE) . |
| 2 132 112 | 7/1984 | (GB) . |

OTHER PUBLICATIONS

ABB Review, No. 9, 1993, pp.13–20, 'Controller Improves Denox Performance in Power Plants'.

*Primary Examiner*—Stanley S. Silverman
*Assistant Examiner*—Michael P. Colaianni
(74) *Attorney, Agent, or Firm*—Norris McLaughlin & Marcus

(57) ABSTRACT

A method for regulating or controlling the content of $NO_x$ in the exhaust gases of a glass-melting furnace having several burners operated in alternation, wherein both the beginning and the end of a combustion break (FP⁺, FP⁻) are supplied to a binary signal generator (8) which passes a signal to a regulator (4) with a time delay and upon receipt of the time-regulator (4), and the amount of $NH_3$ supplied to the denitrating plant is adjusted to a lower constant fixed value F1 via a control, and by means of a memory element (7) a higher constant fixed value F2 is calculated as amount of $NH_3$ and supplied to the regulator (4), whereupon as soon as the regulator (4) has received the signal of the time-delayed end of a combustion break, the fixed value F1 is adjusted to the fixed value F2 via a control, and subsequently the regulation is directly continued.

7 Claims, 3 Drawing Sheets

U.S. PATENT DOCUMENTS

| | | |
|---|---|---|
| 4,314,345 | * 2/1982 | Shiraishi et al. . |
| 4,328,020 | 5/1982 | Hughes . |
| 4,565,679 | 1/1986 | Michalak et al. . |
| 5,425,928 | 6/1995 | Martin et al. . |
| 5,587,136 | * 12/1996 | Ikeyama et al. . |

* cited by examiner

PROCESS FOR THE REGULATING OR CONTROLLING THE $NO_x$ CONTENT OF EXHAUST GASES GIVEN OFF DURING THE OPERATING OF GLASS MELTING FURNACES WITH SEVERAL BURNERS RUN ALTERNATELY

This invention relates to a method of regulating or controlling the content of $NO_x$ in exhaust gases produced during the operation of glass-melting furnaces with several burners which are operated in alternation.

BACKGROUND OF THE INVENTION

Methods of reducing nitrogen oxides in exhaust gases are known. The DE-OS-3615021 describes a method for the selective catalytic reduction of nitrogen oxides from exhaust gases of internal combustion engines by adding ammonia in a reactor. In accordance with this method the addition of ammonia is effected in dependence on the $NO_x$-concentration in the exhaust gas, and the $NO_x$-concentration is determined indirectly by measuring operating parameters of the internal combustion engine and subsequently calculating the concentration of nitrogen monoxide and nitrogen dioxide in dependence on at least one selected operating parameter on the internal combustion engine in consideration of families of characteristics.

In Römpps Chemie-Lexikon, 8th edition, pp. 1484 to 1490 the operation of glass-melting furnaces is described in detail. Glass-melting furnaces mostly are tank furnaces having a plurality of laterally disposed burners which are operated in alternation. The actual heating of the glass-melting furnaces is mostly effected by means of long-distance gas, heating oil or natural gas. The exhaust gases produced contain nitrogen oxides, due to fuels, high temperatures or additives. During the denitrification of exhaust gases, the $NO_x$-content of the pure gas must, for legal reasons, always be monitored in connection with the $O_2$-content of the pure gas, which leads to the fact that in practice the setpoint of the $NO_x$-content, $NO_x$set, is transformed into a standardized setpoint $NO_x$set n. In general, the following relation is used for the standardization:

$$NO_x \text{ set } n = NO_x \text{ set} \cdot \frac{(21 - O_2 \text{act})}{(21 - 8)}$$

However, this standardization is disadvantageous when the glass-melting furnaces comprise several burners which are operated in alternation. If one burner is switched off during a combustion break, the $NO_x$-content of the exhaust gas drops to a relatively large extent. When regulating the content of $NO_x$ in the exhaust gases by means of a simple regulator circuit, the introduced amount of $NH_3$, which reacts with the nitrogen oxides in a known manner, is dependent on the deviation xd, wherein:

$$xd = NO_x \text{set} n - NO_x'$$

With decreasing $NO_x$-content of the exhaust gases both the value $NO_x$set n and the value $NO_x'$ are decreased, which leads to the fact that the deviation xd does not or only insignificantly change. Since with a reduction of the content of $NO_x$ in the exhaust gases the deviation xd changes only insignificantly, the amount of $NH_3$ to be supplied likewise remains almost constant in the denitrating plant, which leads to the fact that more $NH_3$ is introduced than can be reacted with the nitrogen oxides. This in turn leads to the fact that the content of $NH_3$ in the pure gas generally exceeds the admissible limit values. A further disadvantage of this conventional known regulation lies in the fact that the denitrating plant is generally not arranged in direct vicinity of the glass-melting furnaces. Thus, the exhaust gas requires some time to flow from the glass-melting furnace to the pure-gas port of the denitrating plant, in which port the pure gas values are measured in general. When the operation of a burner is interrupted, a $NO_x$-content is measured in the denitrating plant which requires a higher amount of $NH_3$ than this is actually necessary with the real values in the glass-melting furnace. Thus, a certain time must elapse before a regulation by means of a simple regulator circuit can be performed to react on the individual combustion breaks of the burners in the glass-melting furnaces.

SUMMARY OF THE INVENTION

The object underlying the invention is to provide a method of regulating or controlling the content of $NO_x$ in exhaust gases produced during the operation of glass-melting furnaces with several burners which are operated in alternation, where the known standardization of the setpoint $NO_x$set need not be omitted. By means of this method a relatively quick reaction to fluctuating $NO_x$-contents during combustion breaks of individual burners in the glass-melting furnace should furthermore be possible.

DETAILED DESCRIPTION

The object underlying the invention is solved by a method of regulating or controlling the content of $NO_x$ in exhaust gases produced during the operation of glass-melting furnaces with several burners which are operated in alternation, where the setpoint of the $NO_x$-content, $NO_x$set, is supplied to a multiplier, at the same time the content of $O_2$ in the pure gas, $O_2$act, is measured continuously, and the content of $O_2$ detected in a first transducer, $O_2$act', is likewise supplied to the multiplier, and in the multiplier a standardization of the setpoint $NO_x$set into a standardized setpoint $NO_x$set n is effected, where the following applies for the standardization:

$$NO_x \text{ set } n = NO_x \text{ set} \cdot \frac{(21 - O_2 \text{act})}{(21 - 8)}$$

and where the standardized setpoint $NO_x$set n is compared with the content of $NO_x$ in the pure gas, $NO_x'$, which has been detected by a second transducer, the deviation xd resulting from such comparison is supplied to a regulator, which adapts the amount of $NH_3$ to be supplied to the denitrating plant as a correcting variable y for regulating the $NO_x$-content as a regulating variable, and where both the beginning of a combustion break $FP^+$ and the end of a combustion break $FP^-$ are each supplied as a signal to a binary signal generator, which supplies the signals with a time delay as time-delayed beginning of a combustion break $FP_z^+$ or as time-delayed end of a combustion break $FP_z^-$ to the regulator, which interrupts the regulation upon receipt of the signal $FP_z^+$ and adjusts the amount of $NH_3$ to a lower constant fixed value F1 by means of a control, the content of $NO_x$ in the pure gas, $NO_x'$, detected by the second transducer is supplied to a memory element, where it is transformed into a higher constant fixed value F2 as amount of $NH_3$, which is likewise supplied to the regulator, and where, as soon as the regulator has received the signal $FP_z^-$, the fixed value F1 is adjusted to the fixed value F2 via a control, and directly subsequent thereto the regulation is continued. As glass-melting furnaces there are generally used pot furnaces or tank furnaces, which operate continuously or discontinuously and comprise several burners. The term "burner" not only includes the heatings with long-distance gas, heating oil or natural gas, but also heating electrodes. The term "combustion break" refers to the interruption of the operation of at least one burner. The signal for the beginning of a combustion break $FP^+$ is immediately generated whenever the burner is switched off. The signal for the end of a combustion break $FP^-$ is immediately generated whenever the burner is switched on again. The signal for the time-delayed beginning of a combustion break $FP_z^+$ is generated by the binary signal generator a certain period after the burner has been switched off. The signal for the time-delayed end of a combustion break $FP_z^-$ is generated by the binary signal generator a certain period after the burner has been switched on again. In the definition of this time delay $\Delta t$, which in both cases is the same, two definitions are required for technical reasons. When the temperature of the exhaust gases lies between 750 and 1100° C., the denitrification can be effected by addition of $NH_3$ without a catalyst being present. In this case, $\Delta t$ is the time required by the exhaust gas to flow from the glass-melting furnace to the point where $NH_3$ is introduced into the denitrating plant. When the temperatures of the exhaust gases lie in the range between 300 and 450° C., the denitrification not only requires a contacting with $NH_3$, but also a contacting with an appropriate catalyst, for instance titanium dioxide. In this case $\Delta t$ is the time required by the exhaust gas to flow from the glass-melting furnace to that point in the denitrating plant, where it is for the first time both contacted with $NH_3$ and with the used catalyst. The lower constant fixed value F1 represents 5 to 20% of the amount of $NH_3$ introduced directly before the interruption of the regulation. During the transformation of the fixed value F2, values of the content of $NO_x$ in the pure gas, $NO_x'$, are used as starting values, where the memory element can operate in different ways. The fixed value F2 can for instance represent that amount of $NH_3$ which was necessary for adjusting the last-measured content of $NO_x$ in the pure gas. From the last-measured contents of $NO_x$ in the pure gas average values can, however, be formed advantageously, from which then the fixed value F2 can be calculated. It has surprisingly turned out that by means of the inventive method the disadvantages of the known standardization can be eliminated, where it is possible at the same time to relatively quickly react to fluctuating $NO_x$-contents in the glass-melting furnaces, due to the combustion breaks of the individual burners. In the method in accordance with the invention, the admissible limit values of $NH_3$ in the pure gas are thus not exceeded.

In accordance with a preferred aspect of the invention the constant fixed value F1 is 6 to 15% of the amount of $NH_3$ introduced directly before the interruption of the regulation. This is generally not enough for sufficiently converting the still existing content of $NO_x$ in the exhaust gases, where at the same time it can advantageously and easily be avoided that the admissible limit values of $NH_3$ in the pure gas are exceeded.

In accordance with a further preferred aspect of the invention the transformation is effected in a memory element through formation of an average, formed from the contents of $NO_x$ in the pure gas, $NO_x'$, which were measured over a period of 5 to 40 min. Advantageously, the regulation can be continued with a fixed value F2, which is relatively close to the optimum amount of $NH_3$ to be supplied, when the signal $FP_z^-$ is generated by the binary signal generator, i.e. at the time $tFP_z^-$.

In accordance with a further aspect of the invention the period is 12 to 18 min. In general, this period is sufficient to mostly obtain a transformed fixed value F2, by means of which the regulation can be continued quickly and easily. To a particular advantage, the period is 15 min.

In accordance with a further preferred aspect of the invention, the exhaust gases are liberated from $SO_x$, HCl, HF and dust prior to the removal of $NO_x$ upon leaving the glass-melting furnaces. This has a particularly advantageous effect on the execution of the method in accordance with the invention, as disadvantageous influences, due to the noxious substances $SO_x$, HCl, HF and dust, are eliminated. The removal of $SO_x$, HCl and HF at 300 to 500° C. can advantageously be effected in a classical or circulating fluidized bed or in an entrained-bed reactor. For removing $SO_x$, HCl and HF, the exhaust gases are for instance contacted with $Ca(OH)_2$.

In accordance with a further aspect of the invention, the exhaust gases are first of all liberated from $SO_x$, HCl and HF and then passed through an electrostatic dust separator. The electrostatic dust separators used are electrostatic filters operating dry. Advantageously, the electrostatic separator is not contacted with $SO_x$, HCl and HF, which provides for a relatively small maintenance effort.

In accordance with a further aspect of the invention, the removal of $SO_x$, HCl and HF is effected in a fluidized bed through addition of $Ca(OH)_2$. This provides for a relatively complete removal of the noxious substances $SO_x$, HCl and HF with a high efficiency.

The invention will now be explained in detail and by way of example with reference to the drawing (FIGS. 1 to 3).

BRIEF DESCRIPTION OF THE DRAWINGS

FIG. 1 represents the inventive method of regulating or controlling the content of $NO_x$ in exhaust gases. The setpoint $NO_x$set predetermined by the setpoint transmitter 1 is supplied to the multiplier 2. At the same time, the content of $O_2$ in the pure gas, $O_2$act, is measured, and the content of $O_2$ detected in the first transducer 3, $O_2$act', is likewise supplied to the multiplier 2. In the multiplier 2 the setpoint $NO_x$set is standardized to obtain the standardized setpoint $NO_x$set n in consideration of the content $O_2$act' detected in the first transducer 3. The standardized setpoint $NO_x$set n is compared with the content of $NO_x$ in the pure gas, $NO_x'$, which was detected in the second transducer 6. The resulting deviation xd is supplied to a regulator 4, which adapts the amount of $NH_3$ to be supplied to the denitrating plant 5 as a correcting variable y for regulating the $NO_x$-content as a regulating variable. The regulator 4 is understood to be the combination of regulator, actuator and controller. The signal of the beginning of a combustion break $FP^+$ and the signal of the end of a combustion break $FP^-$ is each supplied to a binary signal generator 8. With a time delay, the binary signal generator 8 supplies the signals $FP_z^+$ or $FP_z^-$ to the regulator 4. Upon receipt of the signal $FP_z^+$ the regulation is interrupted by the regulator 4, and the amount of $NH_3$ is adjusted to a lower constant fixed value F1 via a control. The content of $NO_x$ in the pure gas, $NO_x'$, which was detected by the second transducer 6, is supplied to a memory element 7, where it is transformed to a higher constant fixed value F2 as amount of $NH_3$. The memory element 7 is advantageously used for the formation of the average, formed from the content of $NO_x$ in the pure gas, $NO_x'$, measured over a period of 5 to 30 min, from which then the associated fixed value F2 is calculated as amount of $NH_3$ and supplied to the regulator 4. As soon as the regulator 4 has received the signal $FP_z^-$, the fixed value F1 is switched over to the fixed value F2 via a control. Directly thereafter, the regulation is continued. Prior to the removal of $NO_x$, the exhaust gases can advantageously be liberated from $SO_x$, HCl, HF and dust (not represented), as soon as they have left the glass-melting furnaces.

FIG. 2 represents the generally known regulation of the content of $NO_x$ in exhaust gases produced during the operation of glass-melting furnaces with several burners which are operated in alternation, by means of a simple regulator circuit. The known standardization and the slow regulation due to the relatively long distance to be covered by the exhaust gases from the point of introduction of $NH_3$ to the point where the pure gas is measured in the denitrating plant 5 have a disadvantageous effect in this known regulation.

FIG. 3 represents by way of example the function of the amount of $NH_3$ to be supplied to the denitrating plant, $\dot{V}_{NH_3}$, as a function of the time t. 15 min before the time at which the signal $FP^+$ is generated, i.e. 15 min before $tFP^+$, the individual measured contents of $NO_x$ in the pure gas, $NO_x'$, are stored in the memory element 7, the average is formed, and subsequently a fixed value F2 is defined as amount of $NH_3$. After the time delay $\Delta t$, at the point $tFP_z^+$, at which the signal $FP_z^+$ is passed on from the binary signal generator 8 to the regulator 4, the regulation is interrupted and the graph of the function abruptly drops to a fixed value F1 and is kept constant. When the signal of the end of a combustion break $FP^-$ is generated at the point $tFP^-$, the graph will only rise again from the fixed value F1 to the fixed value F2 upon expiration of the time delay $\Delta t$ precisely at the point $tFP_z^-$, at which the signal $FP_z^-$ is supplied from the binary signal generator to the regulator 4. The advantage is that there is a relatively fast change-over from the fixed value F1 to the fixed value F2 at the point $tFP_z^-$, and this change-over is not connected with any regulation-related delay. Directly at the point $tFP_z^-$ the fixed value F2 is reached, and proceeding from this fixed value F2, which is very close to the optimum value of the amount of $NH_3$ to be supplied at this time, the regulation may be continued in an advantageous manner. The time delay $\Delta t$ either is the time required by the exhaust gas to flow from the glass-melting furnace to the point of introduction of $NH_3$ or the time required by the exhaust gas to flow from the glass-melting furnace to that point where the exhaust gas is contacted for the first time with $NH_3$ and a catalyst, for instance titanium dioxide. This depends on the temperatures of the exhaust gas. In FIG. 3 the 15-minute period is illustrated only by way of example. It may comprise a period of 5 to 40 min, advantageously 12 to 18 min.

Figure 1:
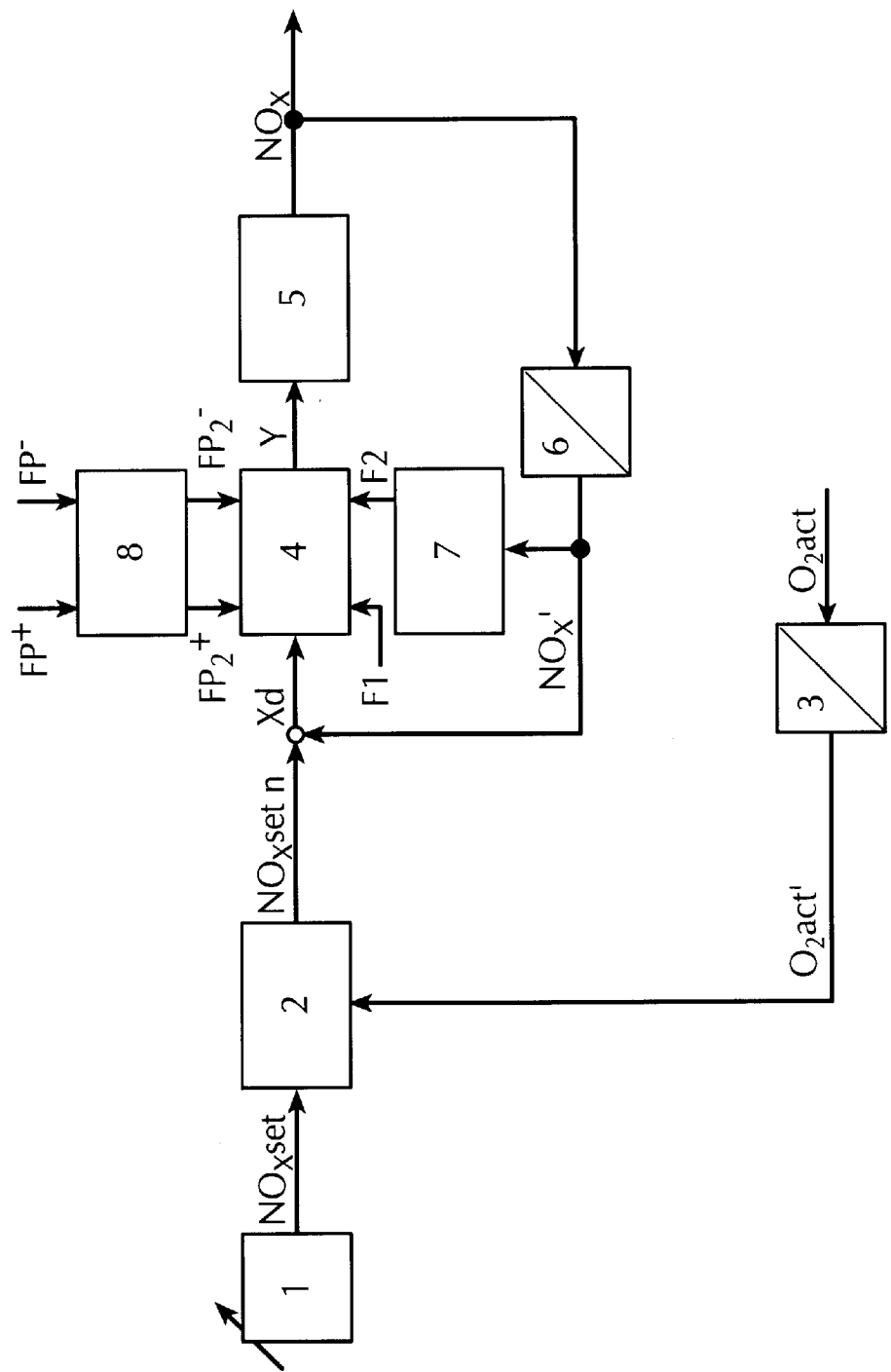
FIG. 1 shows the signal flow diagram in accordance with DIN 19226 of the inventive process for regulating or controlling the $NO_x$-content.
Figure 2:
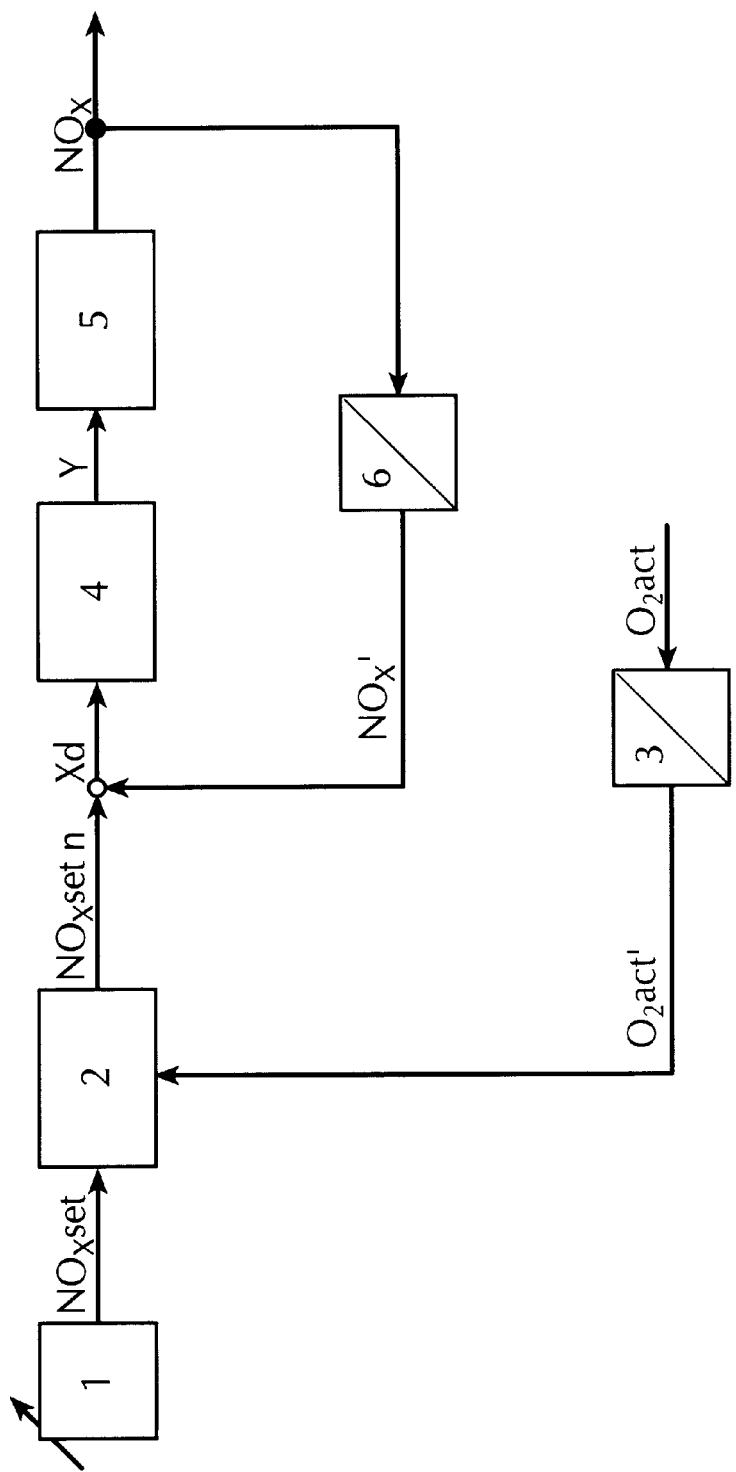
FIG. 2 shows the signal flow diagram in accordance with DIN 19226 of the known regulation of the content of $NO_x$ in exhaust gases produced during the operation of glass-melting furnaces with several burners which are operated in alternation.
Figure 3:
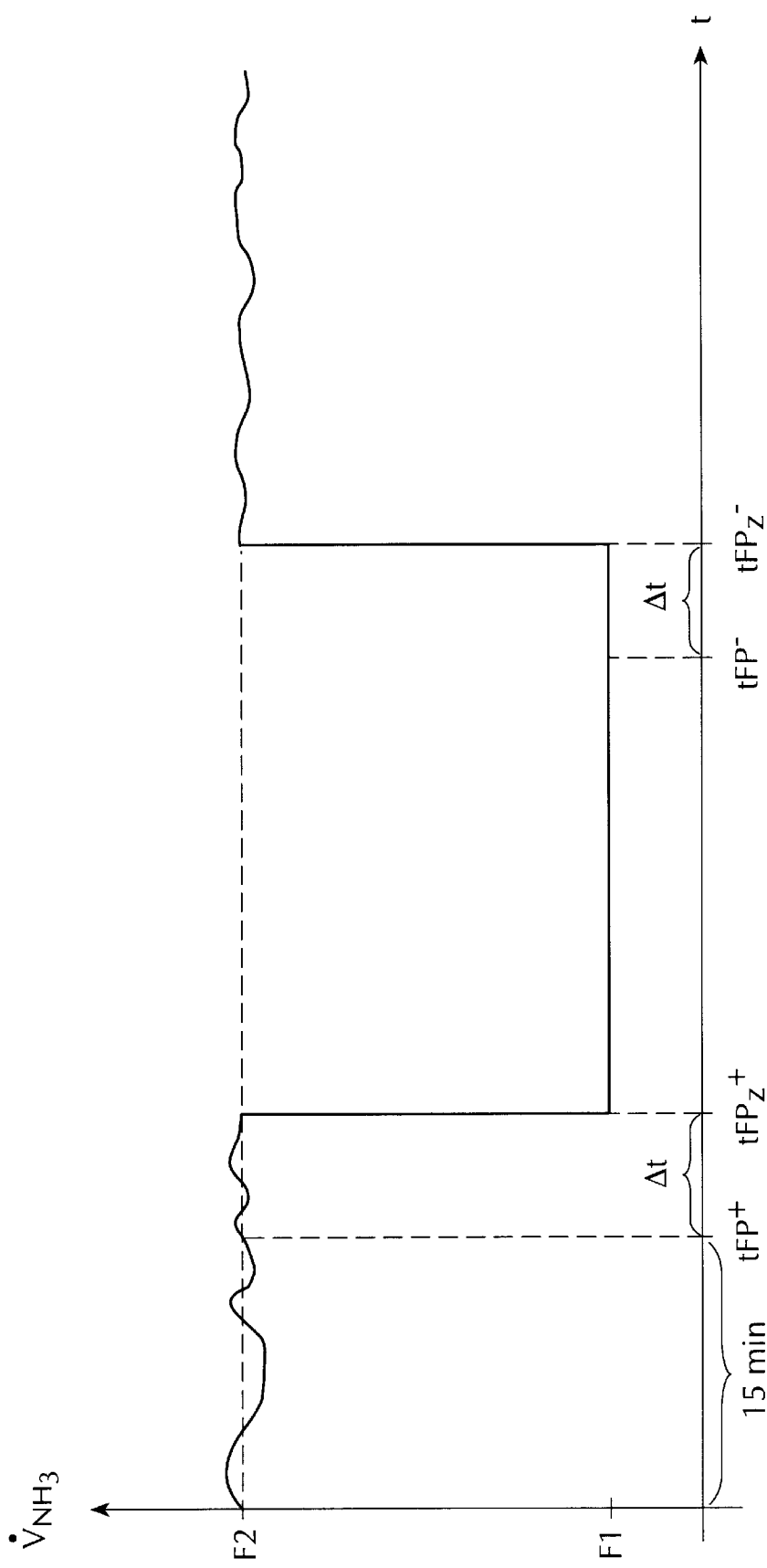
FIG. 3 shows by way of example the flow rate of the amount of $NH_3$, $\dot{V}_{NH_3}$, to be supplied to the denitrating plant, as a function of the time t in accordance with the inventive method.

What is claimed is:

1. A method of regulating or controlling the content of $NO_x$ in exhaust gases released from a denitrating plant associated with the operation of glass-melting furnaces with several burners which are operated in alternation, wherein the setpoint of the content of $NO_x$, $NO_x$set, is supplied to a multiplier (2), at the same time the content of $O_2$ in the released gas, $O_2$act, is measured continuously, and the content of $O_2$ detected in a first transducer (3), $O_2$act', is likewise supplied to the multiplier (2), and in the multiplier (2) a standardization of the setpoint $NO_x$set into a standardized setpoint $NO_x$set n is effected, where the following applies for the standardization:

$$NO_x \text{ set } n = NO_x \text{ set} \cdot \frac{(21 - O_2\text{act})}{(21 - 8)}$$

and where the standardized setpoint $NO_x$set n is compared with the content of $NO_x$ in the released gas detected by a second transducer (6), $NO_x'$, the deviation xd resulting from this comparison is supplied to a regulator (4), which adapts an amount of $NH_3$ to be supplied to the denitrating plant (5) as a correcting variable y for reacting with and regulating the content of $NO_x$ as regulating variable, and where both the beginning of a combustion break $FP^+$ and the end of a combustion break $FP^-$ are each supplied as a signal to a binary signal generator (8), which with a time delay supplies the signals as time-delayed beginning of a combustion break $FP_z^+$ or as time-delayed end of a combustion break $FP_z^-$ to the regulator (4), which interrupts the regulation upon receipt of the signal $FP_z^+$ and adjusts the amount of $NH_3$ to a lower constant fixed value F1 via a control, the amount of $NO_x$ in the released gas detected by the second transducer (6), $NO_x'$, is supplied to a memory element (7), transformed there into a higher constant fixed value F2 as amount of $NH_3$, and is likewise supplied to the regulator (4), and where, as soon as the regulator (4) has received the signal $FP_z^-$, the fixed value F1 is adjusted to the fixed value F2 via a control, whereafter the regulation is continued immediately.

2. The method according to claim 1, wherein the constant fixed value F1 is 6 to 15% of the amount of $NH_3$ introduced immediately before the interruption of the regulation.

3. The method according to claim 1, wherein where the transformation in the memory element (7) is effected through formation of an average, formed from the contents of $NO_x$ in the released gas, $NO_x'$, measured over a period of 5 to 40 min.

4. The method according to claim 3, wherein the period comprises 12 to 18 min.

5. The method according to claim 1, wherein the exhaust gases are liberated from $SO_x$, HCl, HF and dust prior to the removal of $NO_x$ upon leaving the glass-melting furnaces.

6. The method according to claim 5, wherein the exhaust gases are first liberated from $SO_x$, HCl and HF and are then passed through an electrostatic dust separator.

7. The method according to claim 6, wherein the removal of $SO_x$, HCl and HF is effected in a fluidized bed through addition of $Ca(OH)_2$.

* * * * *

UNITED STATES PATENT AND TRADEMARK OFFICE
CERTIFICATE OF CORRECTION

PATENT NO.    : 6,237,368 B1                                             Page 1 of 1
DATED         : May 29, 2001
INVENTOR(S)   : Hans Beisswenger et al.

It is certified that error appears in the above-identified patent and that said Letters Patent is hereby corrected as shown below:

<u>Column 6,</u>
Line 43, "The method according to claim 1, wherein where the transformation..." delete "where"

Signed and Sealed this

Twenty-fifth Day of March, 2003

JAMES E. ROGAN
*Director of the United States Patent and Trademark Office*